(12) United States Patent
Shyu et al.

(10) Patent No.: US 8,049,366 B2
(45) Date of Patent: Nov. 1, 2011

(54) DC POWER SYSTEM FOR HOUSEHOLD APPLIANCES

(75) Inventors: Shian-Shing Shyu, Longtan Shiang (TW); Chung-Lin Lee, Longtan Shiang (TW); Shyh-Wern Sun, Longtan Shiang (TW); Chao-Te Lee, Longtan Shiang (TW)

(73) Assignee: Atomic Energy Council - Institute of Nuclear Energy Research, Taoyuan (TW)

( * ) Notice: Subject to any disclaimer, the term of this patent is extended or adjusted under 35 U.S.C. 154(b) by 0 days.

(21) Appl. No.: 12/200,607

(22) Filed: Aug. 28, 2008

(65) Prior Publication Data

US 2010/0219688 A1    Sep. 2, 2010

(51) Int. Cl.
*H02J 3/06* (2006.01)
(52) U.S. Cl. .......................................... 307/66

(58) Field of Classification Search .............. 307/64–66; 363/15, 16, 34, 123, 140
See application file for complete search history.

(56) References Cited

U.S. PATENT DOCUMENTS

| | | | | |
|---|---|---|---|---|
| 6,914,418 | B2 * | 7/2005 | Sung .............................. | 320/140 |
| 7,117,044 | B2 * | 10/2006 | Kocher et al. ................... | 700/34 |
| 7,193,872 | B2 * | 3/2007 | Siri ................................. | 363/95 |
| 7,786,616 | B2 * | 8/2010 | Naden et al. .................... | 307/64 |
| 7,880,334 | B2 * | 2/2011 | Evans et al. .................... | 307/66 |

* cited by examiner

*Primary Examiner* — Albert W Paladini
(74) *Attorney, Agent, or Firm* — Jackson IPG PLLC; Demian K. Jackson

(57) ABSTRACT

A DC power system is provided to generate the power from renewable energy and directly supplies the DC power to DC household appliances, thus saving energy that would be wasted during the conversion of DC to AC and back to DC and saving the cost of a rectifier or power factor corrector. The DC power system includes a generator, a DC/DC converter, a battery bank, a bi-directional inverter, a DC load and a controller.

7 Claims, 5 Drawing Sheets

DC POWER SYSTEM FOR HOUSEHOLD APPLIANCES

FIELD OF THE INVENTION

The present invention relates to a DC power system for household appliances and, more particularly, to a DC power system for converting renewable energy to 360-volt DC for household appliances.

DESCRIPTION OF THE RELATED ARTS

Most renewable energy is converted to AC power and sent to an AC grid. As shown in FIG. 5, a conventional renewable energy system includes a photovoltaic 31, a charger 32, a 48-volt battery 33 and an inverter 34. The charger 32 is used to convert power source generated from the renewable energy such as a photovoltaic unit 31 to the battery 33. The battery 33 is used to store the energy and regulate the voltage. The inverter 34 is used to convert the DC power, which is provided from the battery 33, to 220-volt AC power and send to an AC grid.

For household appliance, in a conventional air conditioner equipped with a DC brushless motor, a rectifier or a power factor corrector is needed to convert 220-volt AC to 310-volt DC or 360-volt DC, respectively, for driving the DC brushless motor. Similarly, in an electronic ballast lamp, a rectifier or a power factor corrector is needed to convert 220-volt AC to 310-volt DC or 360-volt DC, respectively, for driving the ballast circuit.

In fact, the power source generated from a renewable energy source, such as a photovoltaic unit, is in the form of DC. In a conventional power system, the DC power is converted to AC, and back to DC for a DC brushless motor or a ballast circuit. Therefore, most of the energy is consumed during the conversion of DC to AC and back to DC. Therefore, the energy generated from renewable energy cannot be utilized effectively.

The present invention is therefore intended to obviate or at least alleviate the problems encountered in prior art.

SUMMARY OF THE INVENTION

It is the primary objective of the present invention to directly supply the DC power generated from renewable energy to DC household appliances, thus saving energy that would be wasted during the conversion of DC to AC and back to DC and saving the cost of a rectifier or power factor corrector.

To achieve the foregoing objective, the DC power system includes a generator, a DC/DC converter, a battery bank, a bi-directional inverter, a DC load and a controller. The generator is used to generate the DC power from renewable energy. The DC/DC converter is used to convert the voltage from the generator and then provide the power to a DC bus. The battery bank is used to store the energy and buffer the DC bus voltage. The DC power is charged to the battery bank if the DC bus voltage is higher than the battery voltage. The battery bank discharges to supply the DC power if the battery voltage is higher than the DC bus voltage. The bi-directional inverter is a bi-directional interface between the DC bus and an AC grid and switchable between an inverter mode for converting DC to AC and a power purchasing mode for converting AC to DC. The DC load is energized by the DC bus. The controller is used to monitor the voltage on the DC bus and trip the battery bank when the voltage exceeds trip setpoints. The bi-directional inverter is switched to the inverter mode if the photovoltaic unit provides abundant power causing the DC bus voltage rises above the inverter mode setpoint. The bi-directional inverter is switched to the power purchasing mode if the load is heavy causing DC bus voltage drops below the power purchasing mode setpoint.

Other objectives, advantages and features of the present invention will be apparent from the following description referring to the attached drawings.

BRIEF DESCRIPTIONS OF THE DRAWINGS

The present invention will be described via the detailed illustration of the preferred embodiment referring to the drawings.

DESCRIPTION OF THE PREFERRED EMBODIMENT

Figure 1:
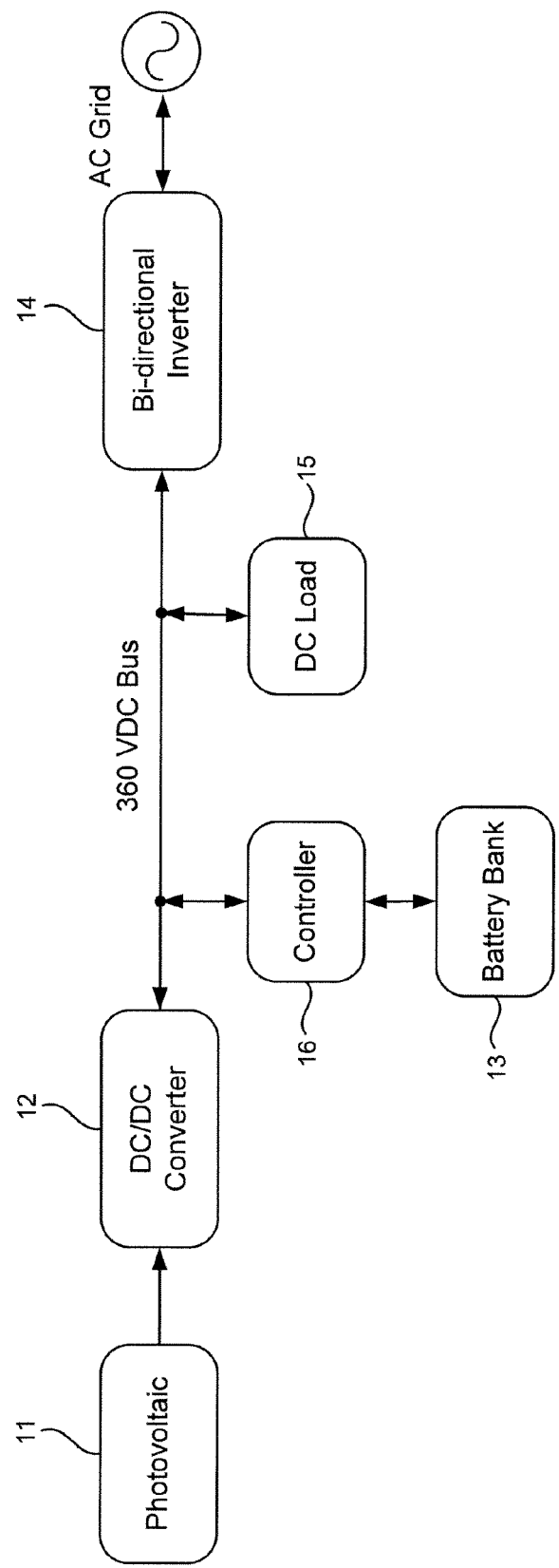
FIG. 1 is a block diagram of a DC power system according to the preferred embodiment of the present invention.

Referring to FIG. 1, a DC power system for household appliances includes a photovoltaic unit 11, a DC/DC converter 12, a battery bank 13, a bi-directional inverter 14, a DC load 15 and a controller 16 according to the preferred embodiment of the present invention.

The photovoltaic unit 11 is used to provide the power to a DC bus. The photovoltaic unit 11 can be replaced with any other proper DC generator such as a fuel cell or a DC rectified wind turbine.

The DC/DC converter 12 is used to convert the DC voltage from the photovoltaic unit 11 and provide the power to the DC bus.

The 360 VDC battery bank 13 is used as an energy storage unit. Moreover, the battery bank 13 is used to buffer the DC bus voltage. The single battery bank 13 could be replaced by any number of parallel battery banks connecting to the DC bus with the voltage of 360 VDC.

The bi-directional inverter 14 is a bi-directional interface between the DC bus and an AC grid. The bi-directional inverter 14 is switchable between an inverter mode and a power purchasing mode. In the inverter mode, the bi-direction inverter 14 is used to convert DC to AC. In the power purchasing mode, the bi-direction inverter 14 is used to convert AC to DC.

The DC load 15 is a household appliance energized by the DC bus. The DC load 15 may be an air conditioner, refrigerator or washing machine equipped with a DC brushless motor, an electronic lamp equipped with a ballast element.

The controller 16 is used to monitor the voltage on the DC bus. If the voltage exceeds trip setpoints, the controller 16 trips the battery bank 13 and turns off the power system.

The photovoltaic unit 11 can be operated over different voltage ranges, such as 150 to 300VDC. The power provided from the photovoltaic unit 11 is converted to about 360-volt DC with the DC/DC converter 12 and fed into the DC bus. The DC power is charged to the battery bank 13 if the DC bus voltage is higher than the battery bank voltage. The battery bank 13 discharges to supply the DC power if the battery bank voltage is higher than the DC bus voltage. In both cases, the DC bus provides the power needed by the DC load 15.

As mentioned above, the bi-directional inverter 14 is switchable between an inverter mode (or "power selling mode") for converting DC to AC and a power purchasing mode for converting AC to DC. The bi-directional inverter 14 is turned off if the DC bus voltage is within the range of an inverter mode setpoint and a power purchasing setpoint. The bi-directional inverter 14 is switched to the inverter mode for converting the 360-volt DC to 220-volt AC to sell electricity to the AC grid when the power generated from the photovoltaic unit 11 is abundant causing DC bus voltage rises above the inverter mode setpoint. The bi-directional inverter 14 is switched to the power purchasing mode to purchase electricity from the AC grid when the load is heavy causing DC bus voltage drops below the power purchasing mode setpoint.

Figure 2:
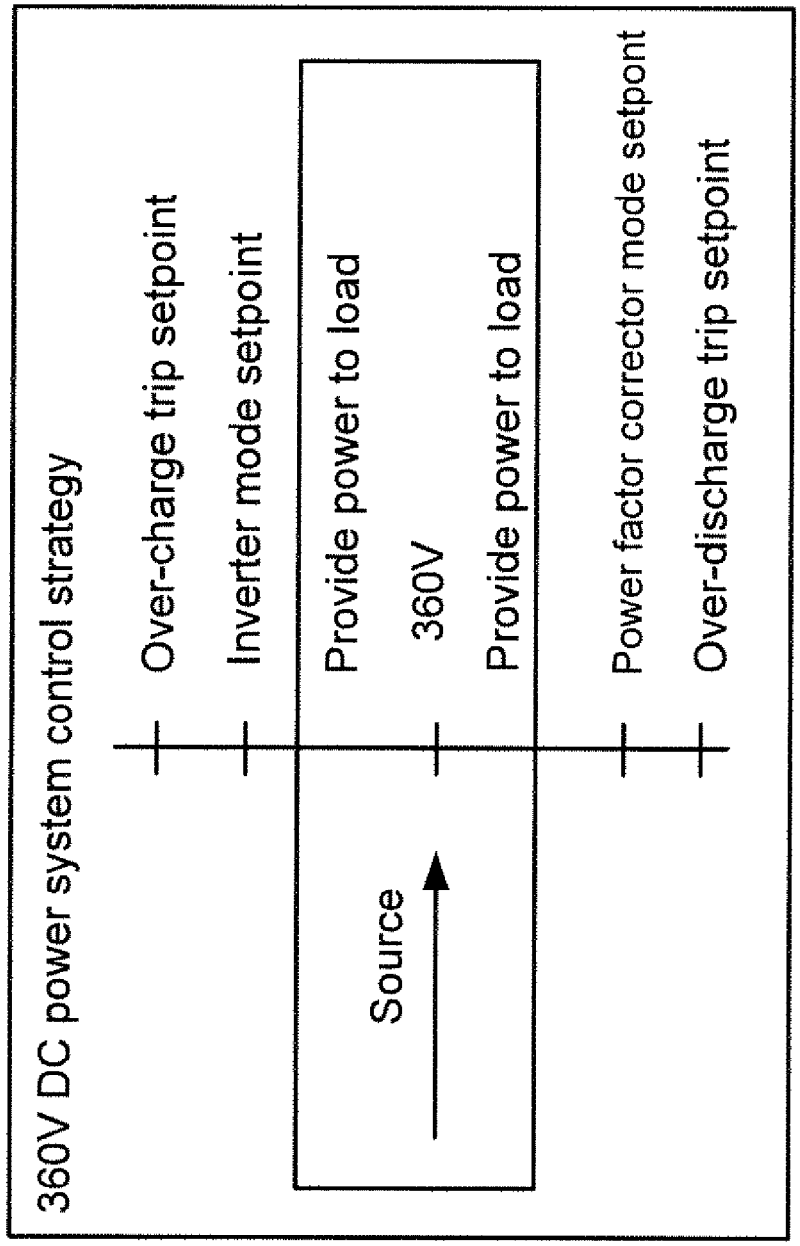
FIG. 2 is a chart for showing a control strategy used in the DC power system shown in FIG. 1.

Referring to FIG. 2, there is a strategy for controlling the DC power system. The operation modes of the DC power system are related to the DC bus voltage.

If the DC bus voltage continues to drop below an over-discharge trip setpoint caused by providing inadequate power from the photovoltaic unit 11 and failure of purchasing electricity from the grid, the controller 16 trips the battery bank 13 and shuts down the DC power system.

If the DC bus voltage continues to rise above an over-charge trip setpoint caused by providing too much power from the photovoltaic unit 11 and failure of selling electricity to the grid, the controller 16 trips the battery bank 13 and shuts down the DC power system.

Figure 3:
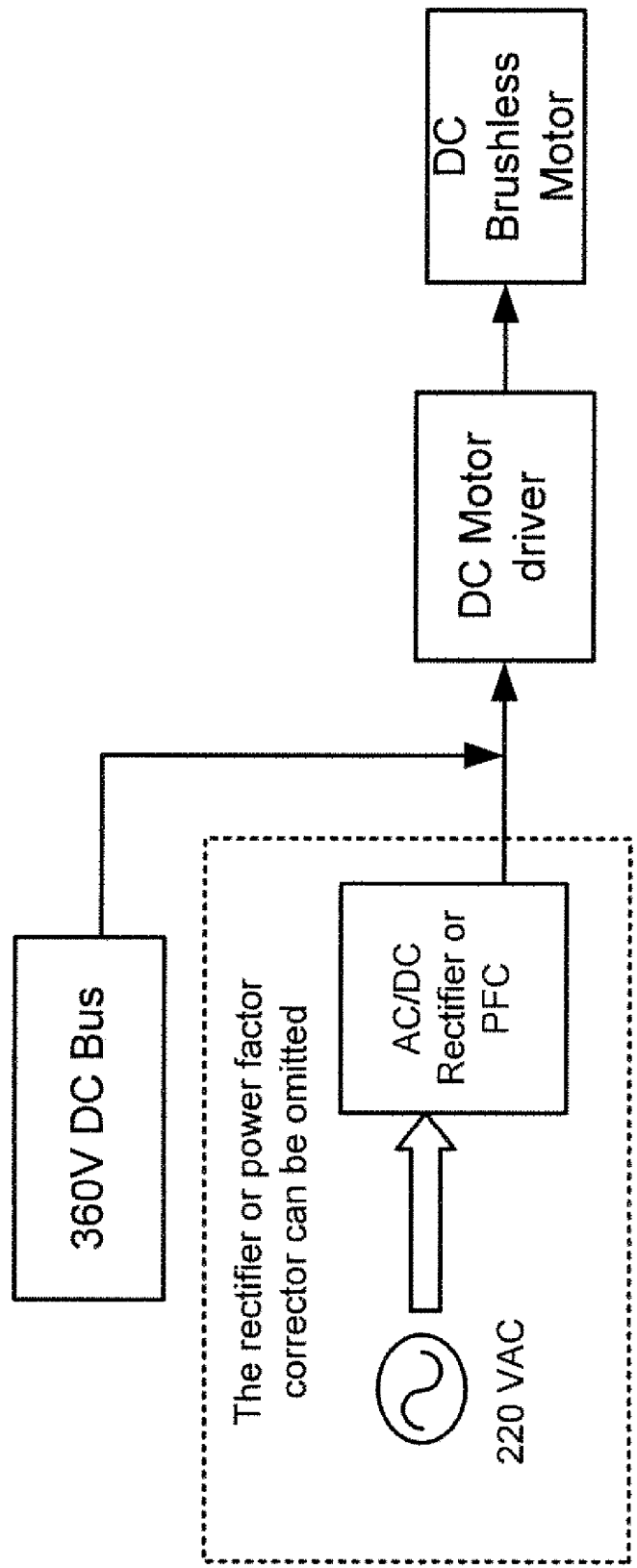
FIG. 3 is a flow chart of the use of the DC brushless motor with the DC power system shown in FIG. 1.
Figure 4:
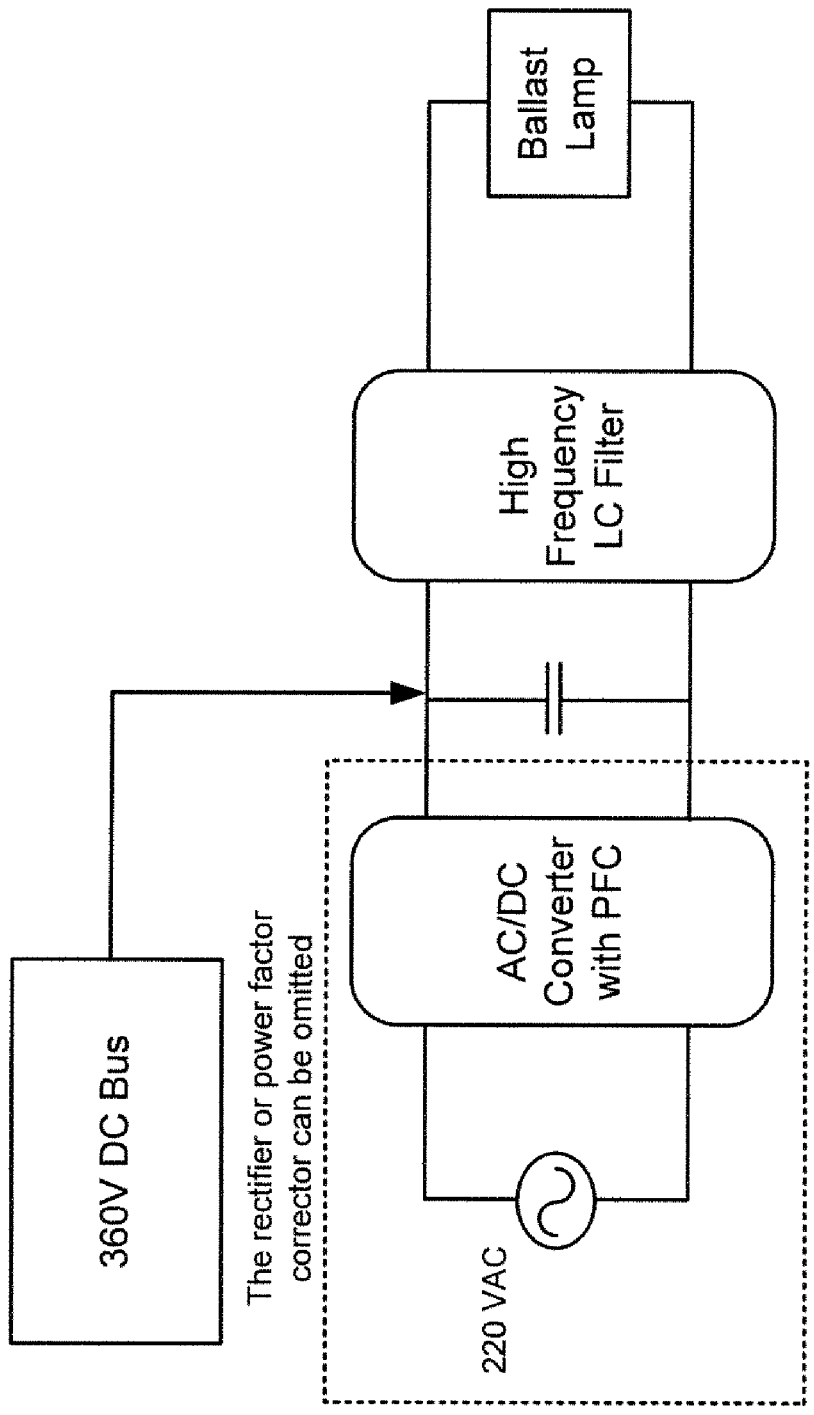
FIG. 4 is a flow chart of the use of the DC electronic ballast lamp with the DC power system shown in FIG. 1.
Figure 5:
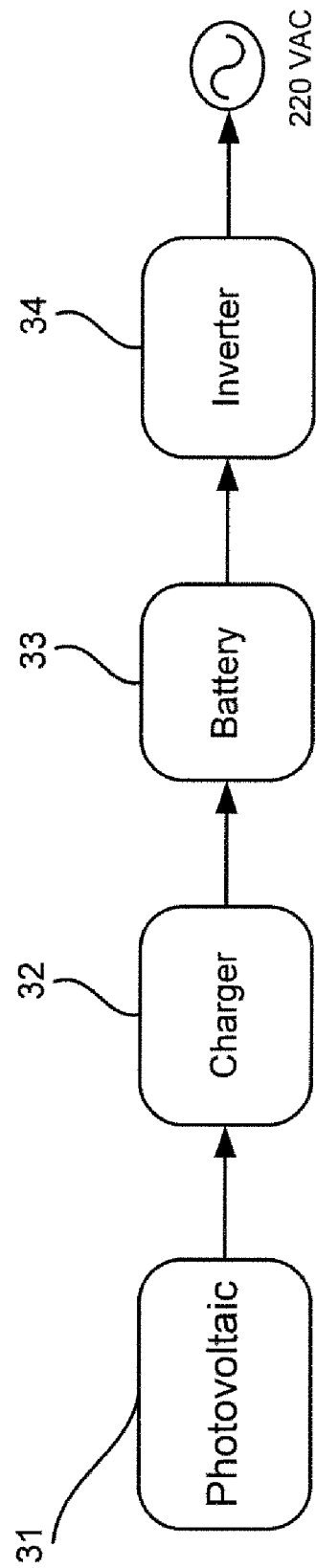
FIG. 5 is a block diagram of a conventional system.

Referring to FIGS. 3 and 4, the DC power system can directly supply the DC power generated from renewable energy to the household appliances such as an air conditioner, a refrigerator and a washing machine equipped with a DC brushless motor, and an electronic ballast lamp. When the DC power provides 360-volt DC to an air conditioner equipped with a DC brushless motor, the DC bus is directly connected to the input terminal of the driver of the DC brushless motor. Therefore, the rectifier or power factor corrector needed in the prior art can be omitted. Similarly, 360-volt DC can be directly provided to the electronic ballast lamp, thus omitting the rectifier or power factor corrector conventionally needed for the electronic ballast lamp.

As discussed above, the DC power system obviates the loss of power related to the conversion of DC to AC and back to DC. This is done by using the DC bus, wherein the voltage is maintained at about 360 volts, to provide DC power to the household appliances so that renewable energy is directly used in the household appliances. In addition to the power is effectively utilized, the cost of the rectifier or power factor corrector is saved.

The present invention has been described via the detailed illustration of the preferred embodiment. Those skills in the art can derive variations from the preferred embodiment without departing from the scope of the present invention. Therefore, the preferred embodiment shall not limit the scope of the present invention defined in the claims.

The invention claimed is:

1. A DC power system for household appliances comprising:
   a generator for generating DC power from renewable energy;
   a DC/DC converter for converting DC voltage from the generator and then providing the converted DC voltage to a DC bus having a DC bus voltage;
   a 360 VDC battery bank for storing energy, wherein the converted DC power is charged to the battery bank if the DC bus voltage is higher than a battery bank voltage, and wherein the battery bank discharges to supply DC power if the battery bank voltage is higher than the DC bus voltage;
   a bi-directional inverter being a bi-directional interface between the DC bus and an AC grid and switchable between an inverter mode for converting DC to AC and a power purchasing mode for converting AC from the AC grid to DC;
   a DC load energized by the DC bus; and
   a controller for monitoring the voltage on the DC bus and tripping the battery bank and turning off the DC power system when the DC bus voltage exceeds trip setpoints; wherein the bi-directional inverter is switched to an inverter mode if the generator provides abundant power causing DC bus voltage rises above an inverter mode setpoint; and wherein the bi-directional inverter is switched to a power purchasing mode if the load is heavy causing DC bus voltage drops below a power purchasing mode setpoint.

2. The DC power system according to claim 1, wherein the generator is selected from a group consisting of a photovoltaic unit, a fuel cell and a DC rectified wind turbine.

3. The DC power system according to claim 1, wherein the DC/DC converter converts to about 360-volt DC.

4. The DC power system according to claim 1, wherein the single battery bank comprises one or more parallel battery banks connecting to the DC bus with a voltage of 360 VDC.

5. The DC power system according to claim 1, wherein the DC load is selected from a group consisting of an air conditioner, a refrigerator, a washing machine equipped with a DC brushless motor, and an electronic ballast lamp equipped with a ballast element.

6. The DC power system according to claim 1, wherein the controller trips the battery bank and shuts down the DC power system when the DC bus voltage continues to drop below an over-discharge trip setpoint caused by providing inadequate power from the photovoltaic unit and failure of purchasing electricity from the AC grid.

7. The DC power system according to claim 1, wherein the controller trips the battery bank and shuts down the DC power system when the DC bus voltage continues to rise above an over-charge trip setpoint caused by providing too much power from the photovoltaic unit and failure of selling electricity to the AC grid.

* * * * *